May 12, 1925.
W. L. ELLISON
BEARING SCRAPER
Filed July 18, 1923
1,537,423
2 Sheets-Sheet 1
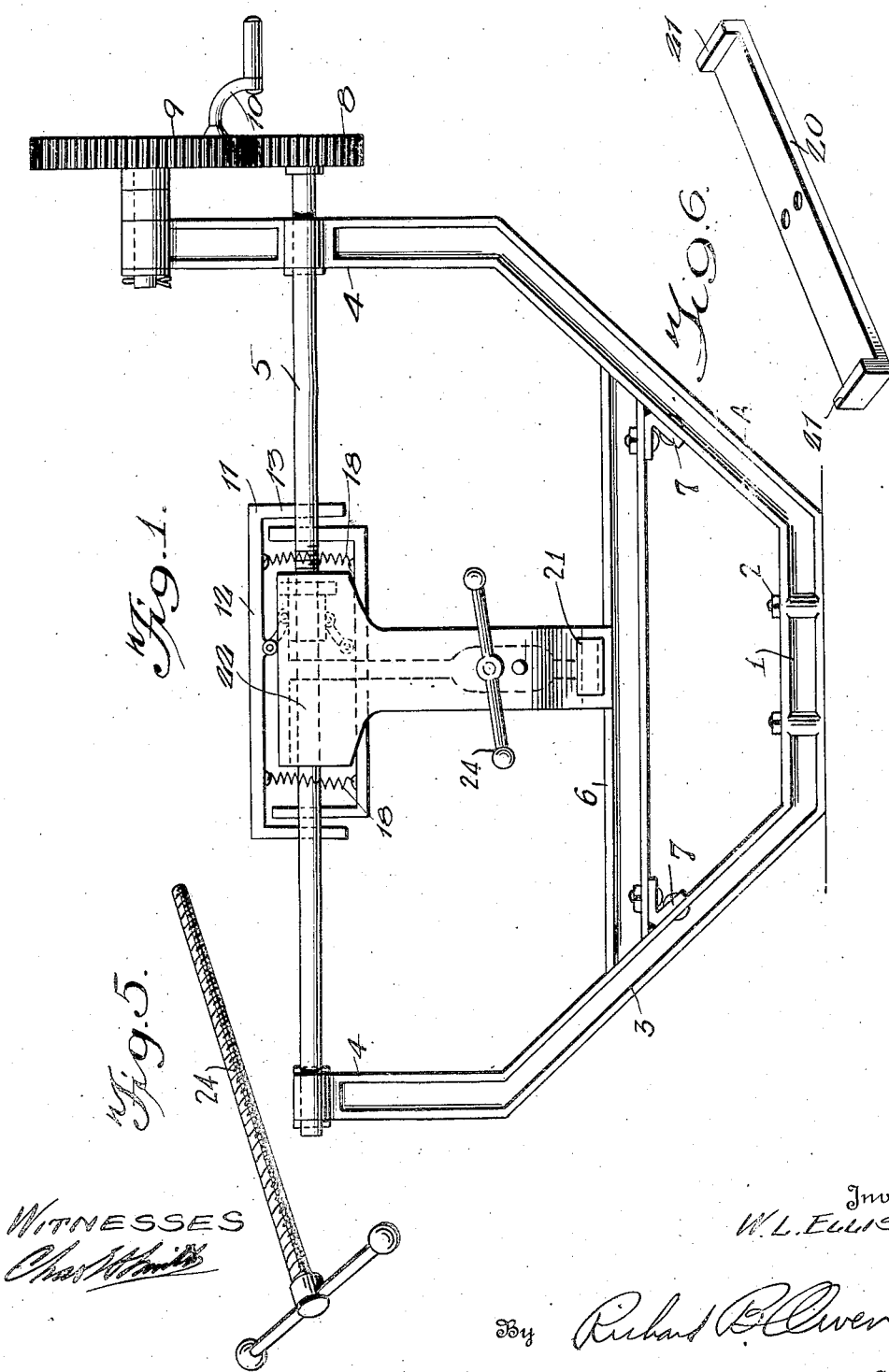
Inventor
W. L. Ellison,
By Richard B. Owens
Attorney

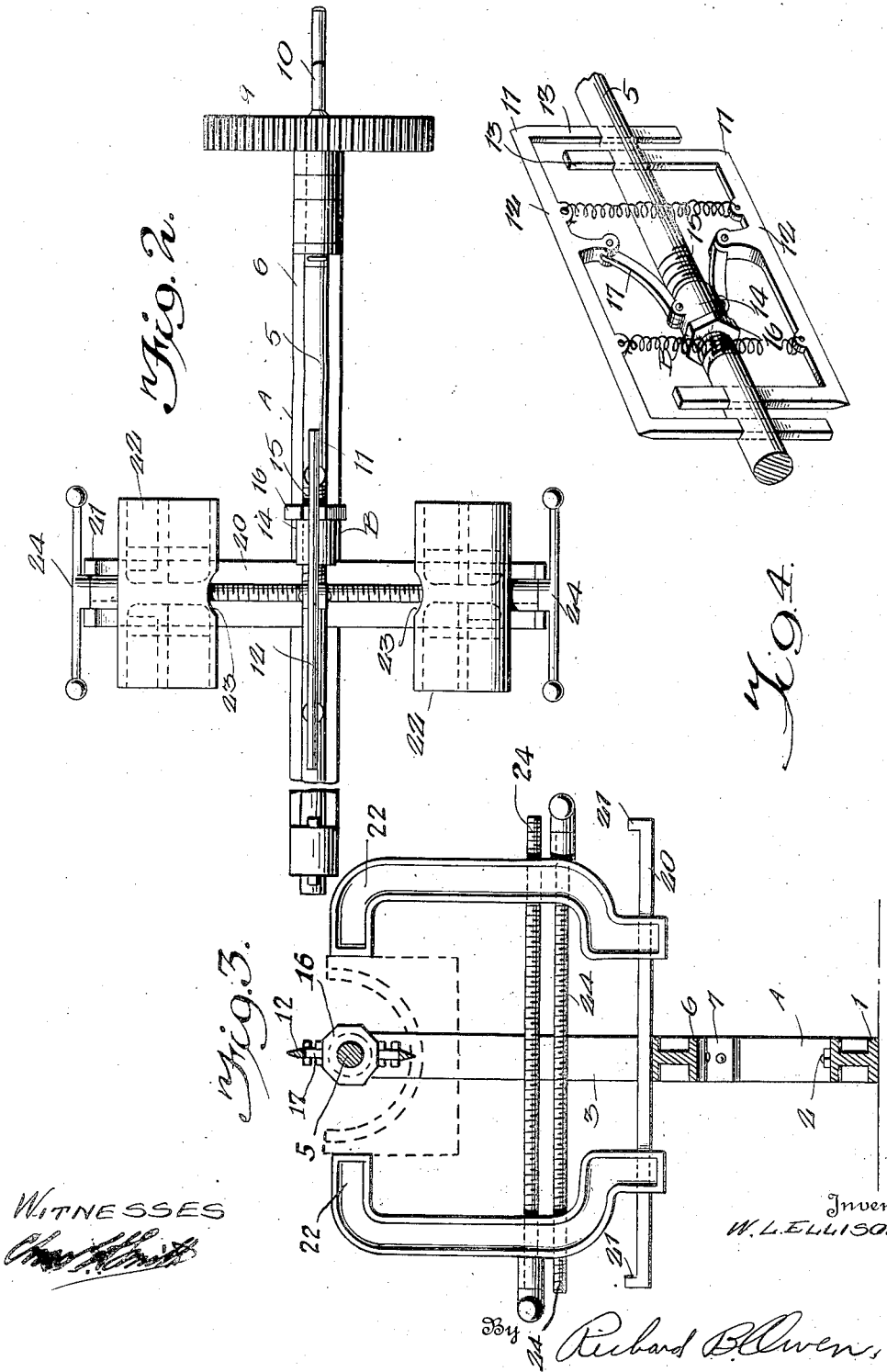

Patented May 12, 1925.

1,537,423.

UNITED STATES PATENT OFFICE.

WILLIAM LEE ELLISON, OF GIDDINGS, TEXAS.

BEARING SCRAPER.

Application filed July 18, 1923. Serial No. 652,426.

*To all whom it may concern:*

Be it known that I, WILLIAM LEE ELLISON, a citizen of the United States, residing at Giddings, in the county of Lee and State of Texas, have invented certain new and useful Improvements in a Bearing Scraper, of which the following is a specification.

The present invention aims to provide a device for scraper bearings and the like, and has for its primary object to provide means whereby the scraper may be efficiently accomplished by means of a pair of adjustable scrapers capable of ready operation to the dimension desired and a supporting mechanism whereby a bearing may be firmly held while being operated upon by the scrapers.

A still further object of this invention is the provision of a device for scraper bearings of the above stated character which is simple, durable, and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which, Figure 1 is an elevation of the device embodying my invention, Figure 2 is a top plan view thereof, Figure 3 is a transverse section taken therethrough, Figure 4 is a detail perspective view of the scrapers, Figure 5 is a detail perspective of one of the operating members for the supporting mechanism, and Figure 6 is a detail perspective of a track member used in the supporting mechanism.

Referring to the drawing in detail it will be seen that the device consists generally of a frame, a bearing supporting mechanism, and a scraper mechanism.

The frame A is of substantial V-shaped formation including a base or intermediate portion 1 which may be suitably fastened to a support as at 2. A pair of arms 3 diverge from each other and extend from the ends of this base 1 and terminate in the vertical extensions 4 provided with suitable bearings for receiving a shaft 5. A bridge beam 6 forms part of the frame A and spans the intermediate portions of the legs 3 being attached thereto by brackets 7.

The shaft 5 forms part of the scraper mechanism and a gear 8 is keyed to one end thereof and meshes with a larger gear 9 which is journalled at the upper ends of one of the extensions 4. A handle or crank 10 is attached to the larger gear 9 for operation thereof. A pair of scrapers each of which is indicated generally at 11 consists of a U-shaped structure including the intermediate blade portion 12 and the legs or side members 13 which project through the shaft 5 and are movable therethrough. Thus the blade portions 12 may be adjusted in relation to each other by an adjustment mechanism indicated generally at B. This adjustment mechanism includes a sleeve 14 slidable on the shaft 5. The portion of the shaft over which this sleeve is slidable is threaded as at 15 so that a nut 16 may be engaged therewith. Links 17 are pivotally attached to the sleeve 14 and also to the blades 12. Thus by actuation by this nut on the threaded portion 15 the sleeve may be moved so as to push the blade portions 12 away from each other and the springs 18 are tensioned to normally draw the blades toward each other. One scraper is longer than the other so that the legs 13 of one scraper are disposed between the legs of the other as is clearly illustrated in Figure 4.

The supporting mechanism is mounted upon the beam 6 and consists of a track bar 20 having stop lugs 21 at its ends. This track bar 20 is bolted to the bridge beam 6 so as to extend tranversely thereof. A pair of jaws or clamping members 22 are slidable on this track bar 20 and are provided with curved portions the terminals of which are notched as at 23 for engagement with a bearing. These jaws or clamping members 22 may be moved toward or away from each other by means of the threaded bolts 24. There are two of these threaded bolts 24 and each is threaded through one jaw and rotatable freely through the other. Thus in Fig. 3 the upper threaded bar is threadedly engaged with the right hand jaw 22 while the lower threaded bar is threadedly engaged with the left hand jaw 22. By the operation of these bolts it will readily be understood that the jaws may be moved into firm and tight engagement with a bearing so as to support it while the scrapers are being rotated within the bearing by the operating mechanism consisting of the gears 9 and 8 and the shaft 5.

It will be observed from the foregoing that my improved apparatus is simple and durable, and is susceptible of being readily adjusted and operated in an efficient manner.

I have entered into a detailed description of the construction and relative arrangement of the parts of my improved apparatus in order to impart a full, clear, and exact understanding of the same. I do not desire, however, to be understood as confining myself to such specific construction and arrangement of parts, as such changes or modifications may be made as fairly fall within the scope of my invention.

Having thus described my invention, what I claim as new is:

1. In combination, a supporting frame, including a base, a pair of diverging legs extending upwardly from the ends of the base and terminating in journals, a shaft rotatable in said journals, a bridge beam connected to the intermediate portion of the legs, means for rotating the shaft, a bearing supporting mechanism mounted on the beam, and a scraper mechanism operatable by said shaft.

2. In combination, a supporting frame, a bearing supporting mechanism on the frame, a scraper mechanism, means for operating the scraper mechanism, said scraper mechanism consisting of a pair of U-shaped scrapers including means for adjusting the same in relation to each other.

3. A scraper mechanism including a shaft, a pair of scrapers, each substantially U-shaped to provide an intermediate blade and a pair of legs slidable through the shaft and means for moving the scrapers in relation to each other.

4. A scraper mechanism including a shaft, a pair of U-shaped scrapers having their ends slidable through the shaft, said shaft provided with threads between the ends of the scrapers, a sleeve slidable on the threaded portion of the shaft, a nut on the threaded portion of the shaft, for actuation of the sleeve, links pivotally connected to the sleeve and to the scrapers, and springs tending to urge the scrapers toward each other all in the manner and for the purpose specified.

5. In combination a supporting frame, a bearing supporting mechanism including a track bar, a pair of jaws slidable on the track bar, a pair of threaded bolts associated with the jaws for moving them in relation to each other, and a scraper mechanism all in the manner and for the purpose specified.

In testimony whereof I affix my signature in presence of two witnesses.

WILLIAM LEE ELLISON.

Witnesses:
 G. R. MIERTSCHIN,
 JOHN KNOX.